United States Patent
Parker et al.

(10) Patent No.: US 6,853,519 B2
(45) Date of Patent: Feb. 8, 2005

(54) MAGNETIC HEAD HAVING HIGH CONDUCTIVITY LEAD STRUCTURES SEEDED BY EPITAXIALLY MATCHED SEED LAYER

(75) Inventors: Michael Andrew Parker, Fremont, CA (US); Mustafa Pinarbasi, Morgan Hill, CA (US); Robert Otto Schwenker, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 10/273,451

(22) Filed: Oct. 17, 2002

(65) Prior Publication Data

US 2004/0075954 A1 Apr. 22, 2004

(51) Int. Cl.⁷ .............................. G11B 5/127; G11B 5/39
(52) U.S. Cl. ...................................................... 360/322
(58) Field of Search ................................ 360/322, 313, 360/110

(56) References Cited

U.S. PATENT DOCUMENTS

| | | | |
|---|---|---|---|
| 4,652,499 A | 3/1987 | Howard | 428/641 |
| 5,059,278 A | 10/1991 | Cohen et al. | 216/22 |
| 5,326,429 A | 7/1994 | Cohen et al. | 216/22 |
| 5,657,192 A | 8/1997 | Cohen et al. | 360/126 |
| 5,659,451 A | 8/1997 | Cohen et al. | 360/126 |
| 5,835,315 A | 11/1998 | Cohen et al. | 360/126 |
| 6,059,984 A | 5/2000 | Cohen et al. | 216/22 |
| 6,185,081 B1 | 2/2001 | Simion et al. | 360/327.3 |
| 6,447,839 B1 * | 9/2002 | Hegde et al. | 427/125 |
| 2002/0186516 A1 * | 12/2002 | Larson et al. | 360/324.12 |
| 2004/0144995 A1 * | 7/2004 | Nagahama et al. | 257/200 |

FOREIGN PATENT DOCUMENTS

EP 1308936 A1 * 7/2003

* cited by examiner

Primary Examiner—Julie Anne Watko
(74) Attorney, Agent, or Firm—Robert O. Guillot; Intellectual Property Law Offices

(57) ABSTRACT

The present invention is directed towards increasing the conductivity of the electrical lead material in the read head portion of a magnetic head, such that thinner electrical leads can be fabricated while the current carrying capacity of the leads is maintained. This increase in electrical lead conductivity is accomplished by fabricating the electrical lead upon an epitaxially matched seed layer, such that the crystalline microstructure of the electrical lead material has fewer grain boundaries, whereby the electrical conductivity of the lead material is increased. In a preferred embodiment, the electrical lead material is comprised of Rh, which has an FCC crystal structure, and the seed layer is comprised of a metal, or metal alloy having a BCC crystal structure with unit cell lattice constant dimensions that satisfy the relationship that $a_{bcc}$ is approximately equal to $0.816a_{fcc}$. In various embodiments, the seed layer is comprised of VMo or VW.

24 Claims, 2 Drawing Sheets

MAGNETIC HEAD HAVING HIGH CONDUCTIVITY LEAD STRUCTURES SEEDED BY EPITAXIALLY MATCHED SEED LAYER

BACKGROUND OF THE INVENTION

1. Field of the Invention

The present invention relates generally to the fabrication of magnetic heads for hard disk drives, and particularly to the fabrication of electrical leads within the read head portions of such magnetic heads.

2. Description of the Prior Art

As is well known, the read head portion of a magnetic head is fabricated utilizing thin film deposition techniques on an upper surface of a wafer substrate. In fabricating a typical read head, a plurality of layers and structures are deposited that generally include a first magnetic shield, an insulation layer, magnetoresistive sensor layers, and magnetic hard bias elements. Electrical leads, a second insulation layer and a second magnetic shield are then deposited. Further magnetic head components such as write head structures are then fabricated to complete the magnetic head.

As areal data storage densities increase and read gap dimensions decrease, the thickness of the second insulation layer has been decreased and the thickness of the electrical leads has also preferably been decreased in order to prevent electrical shorts through the second insulation layer to the second magnetic shield. However, any reduction in the electrical lead thickness must be accomplished while providing reasonable operating currents for the sensor, and increasing the conductivity of the electrical leads allows for the same current to be carried in thinner leads. Thus, higher conductivity electrical lead structures are important for continued increases in areal data storage density. This invention is directed towards a method for increasing the conductivity of the electrical lead material through modification of its crystalline microstructure.

Methods for increasing lead conductivity have relied on using higher conductivity lead metallurgies based on high conductivity metals such as Au. However, Au is known to have a smearing problem upon definition of the lead in the row fabrication process. Also, Au, unless great care is taken in its heat treatment with Ta capping layers, can become thermally unstable by growing nodules that short out the lead to the second magnetic shield.

SUMMARY OF THE INVENTION

In the read head portion of a magnetic head it is desirable to reduce the thickness of the electrical leads in order to reduce the incidence of electrical shorts and to produce hard disk drives having increased areal data storage density. However, where the electrical lead thickness is decreased, an undesirable reduction in the current carrying capacity of the electrical leads also typically occurs. Therefore, the present invention is directed towards increasing the conductivity of the electrical lead material, such that thinner electrical leads can be fabricated while the current carrying capacity of the leads is maintained. This increase in electrical lead conductivity is accomplished in the present invention by fabricating the electrical lead upon an epitaxially matched seed layer, such that the crystalline microstructure of the electrical lead material has fewer grain boundaries and intragranular defects, whereby the electrical conductivity of the lead material is increased.

In the preferred embodiments, the electrical lead material is comprised of a material such as Cu, Ag, Ir and Rh, which has an FCC crystal structure, and the seed layer is comprised of a metal, or metal alloy having a crystal structure with closely matching interatomic spacings and arrangements. Basically, the seed layer is comprised of a material that is epitaxially matched between atomic sites along a first closest packed direction of a first closest packed plane in said seed layer across the interface of said seed layer with said lead layer, to a second closest packed direction of a second closest packed plane in said electrical lead layer material, wherein said first closest packed plane in said seed layer is essentially parallel to said second closest packed plane in said electrical lead layer. In the preferred embodiments, the seed layer has a BCC crystal structure with unit cell lattice constant dimensions that satisfy the relationship $a_{bcc}$ is approximately equal to $0.816 a_{fcc}$ with a misfit that is generally no greater than 10% and preferably within 3%. In various embodiments, the electrical lead layer is preferably composed of Rh, and the seed layer includes a VMo alloy with the amount of V from approximately 29 at. % to 39 at. %, and preferably approximately equal to 34 at. %, or a VW alloy with the amount of V from approximately 38 at. % to 48 at. %, and preferably approximately equal to 43 at. %. A seed layer of the present invention has a thickness of from 5 Å to 100 Å and preferably around 35 Å. The use of the epitaxially matched seed layer can result in a 5 to 20% reduction in the electrical lead thickness, and can therefore result in a smaller magnetic head read gap and a corresponding increase in the areal data storage density of a hard disk drive using the magnetic head.

It is an advantage of the magnetic head of the present invention that it is fabricated with thinner electrical leads.

It is another advantage of the magnetic head of the present invention that it is fabricated with electrical leads comprised of a high electrical conductivity material.

It is a further advantage of the magnetic head of the present invention that the electrical leads thereof are fabricated upon an epitaxially matched seed layer.

It is yet another advantage of the magnetic head of the present invention that it is fabricated with electrical leads comprised of a material such as Cu, Ag, Ir and Rh having an FCC crystal structure, that are fabricated upon a seed layer having a BCC crystal structure, where $a_{bcc}$ is approximately equal to $0.816 a_{fcc}$.

It is a yet a further advantage of the magnetic head of the present invention that it includes a seed layer that may be comprised of VMo or VW.

It is an advantage of the hard disk drive of the present invention that it has an increased areal data storage density.

It is another advantage of the hard disk drive of the present invention that it includes a magnetic head having decreased electrical lead thicknesses, such that the areal data storage density of the hard disk drive may be increased.

It is a further advantage of the hard disk drive of the present invention that it includes a magnetic head that is fabricated with thinner electrical leads.

It is yet another advantage of the hard disk drive of the present invention that it includes a magnetic head that is fabricated with electrical leads comprised of a high electrical conductivity material.

It is yet a further advantage of the hard disk drive of the present invention that it includes a magnetic head having electrical leads that are fabricated upon an epitaxially matched seed layer.

It is still another advantage of the hard disk drive of the present invention that it includes a magnetic head that it is fabricated with electrical leads comprised of a material such as Cu, Ag, Ir and Rh having an FCC crystal structure, that are fabricated upon a seed layer having a BCC crystal structure, where $a_{bcc}$ is approximately equal to $0.816 a_{fcc}$.

It is still a further advantage of the hard disk drive of the present invention that it includes a magnetic head that includes a seed layer that may be comprised of VMo or VW.

These and other features and advantages of the present invention will no doubt become apparent to those skilled in the art after having read the following detailed description, which makes reference to the several figures of the drawings.

IN THE DRAWINGS

Figure 6:
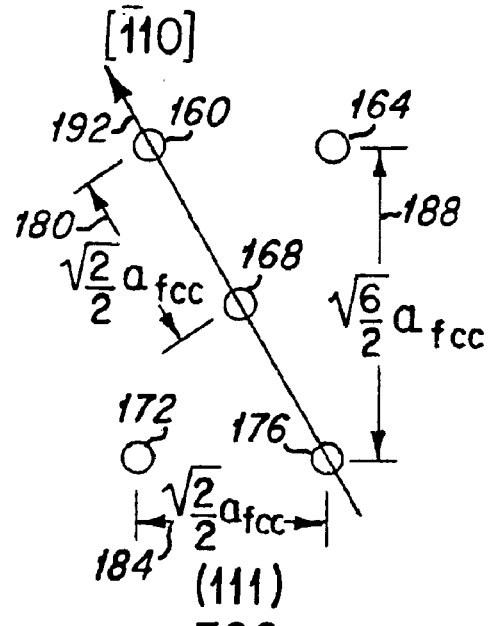
Figure 7:
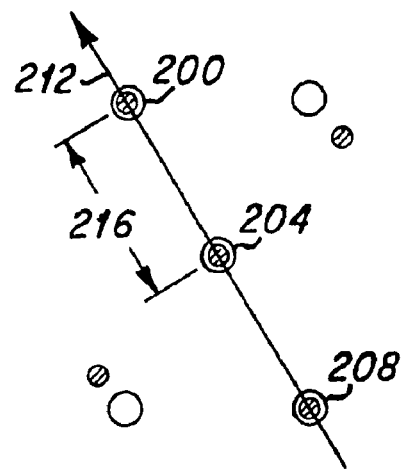

FIG. 6 is a projection of a closest packed (111) plane in an FCC crystal structure showing the arrangement of atomic sites in a lead layer that interfaces with a seed layer and the relationship of the sites to a closest packed [$\bar{1}$10] direction; and FIG. 7 is an overlay of the projection of the (111) plane in an FCC lead layer onto the projection of the (110) plane in a BCC seed layer showing the epitaxial matching of the distances between atomic sites between the two respective structures and the relationship of these sites to respective parallel closest packed directions, [$\bar{1}$10] and [$\bar{1}$11], for parallel (111) and (110) planes across an interface between the two layers.

DETAILED DESCRIPTION OF THE PREFERRED EMBODIMENTS

Figure 1:
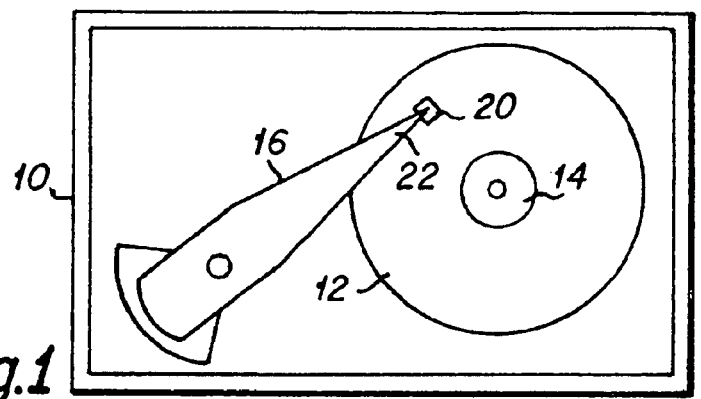
FIG. 1 is a top plan view of a typical hard disk drive including a magnetic head of the present invention.

FIG. 1 is a top plan view that depicts significant components of a hard disk drive, which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic heads are fabricated. Such heads are fabricated in large quantities upon a wafer substrate and subsequently sliced into discrete magnetic heads 20.

Figure 2:
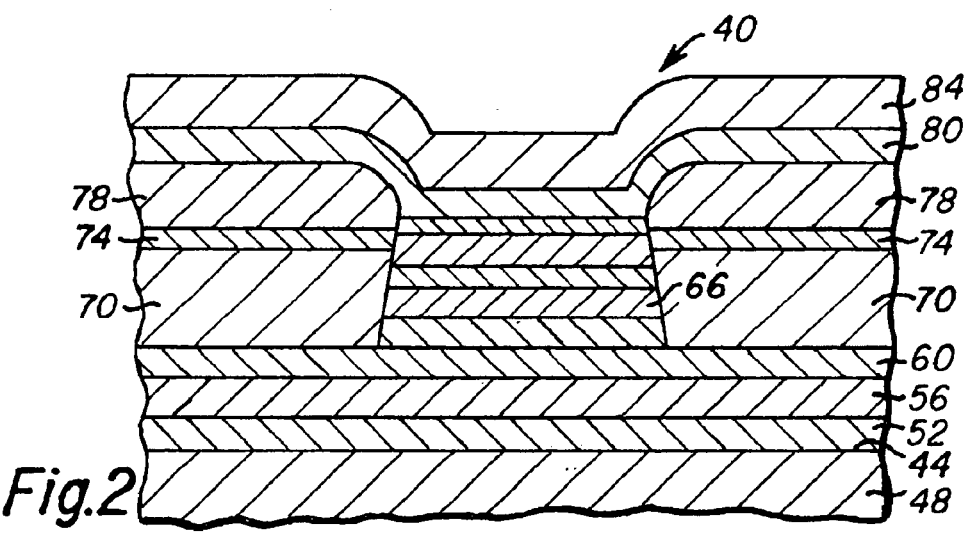
FIG. 2 is a side cross-sectional view of a prior art read head portion of a magnetic head.

FIG. 2 is a cross-sectional view of a read head portion 40 of a magnetic head 20 shown to facilitate the understanding of the present invention. As is well known to those skilled in the art, a read head structure 40, is fabricated utilizing thin film deposition techniques on an upper surface 44 of a wafer substrate 48. In fabricating the read head portion 40, a first electrical insulation layer 52 is deposited upon the surface 44 of the substrate 48, followed by the deposition of a first magnetic shield 56, followed by another insulation layer 60, followed by the fabrication of a plurality of layers and structures that generally include a plurality of active magnetoresistive read head layers 66, and magnetic hard bias elements 70. An electrical lead seed layer 74 is next deposited, followed by the deposition of material that comprises the electrical leads 78 upon the seed layer 74. Thereafter, a further insulation layer 80 is deposited, followed by a second magnetic shield 84, and further magnetic head components (not shown), such as write head structures, that complete the magnetic head. In some prior art magnetic head designs, the second magnetic shield 84 may also function as one of the magnetic poles of the write head structure.

As indicated above, the present invention is directed towards the problem of reducing electrical lead shorts across the insulation layer 80 to the magnetic shield 84 for narrow read gaps at higher areal data storage densities, by providing a thinner electrical lead 78 with the same current carrying capacity as a thicker prior art lead. This is accomplished by improving the crystalline microstructure of the electrical lead 78 to improve its current carrying capacity. Therefore, the focus of the present invention is on the materials that are utilized to form the electrical leads 78, and on the seed layer 74 upon which the electrical leads are fabricated.

Figure 3:
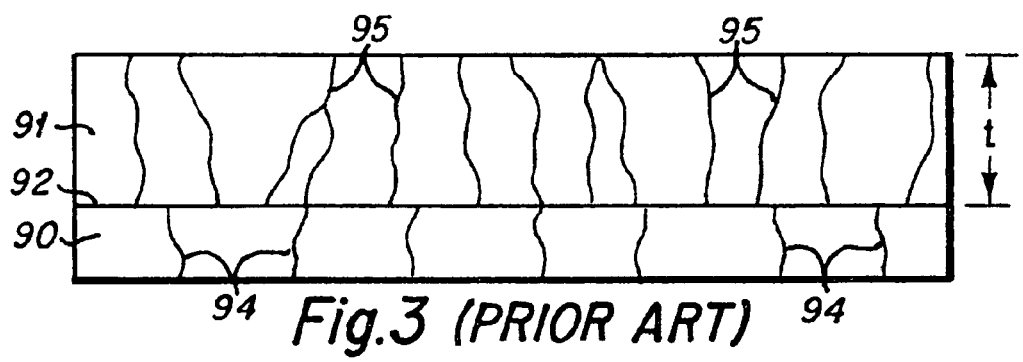
FIG. 3 is an enlarged cross-sectional view of a prior art seed layer and electrical lead layer of a read head portion of a magnetic head.
Figure 4:
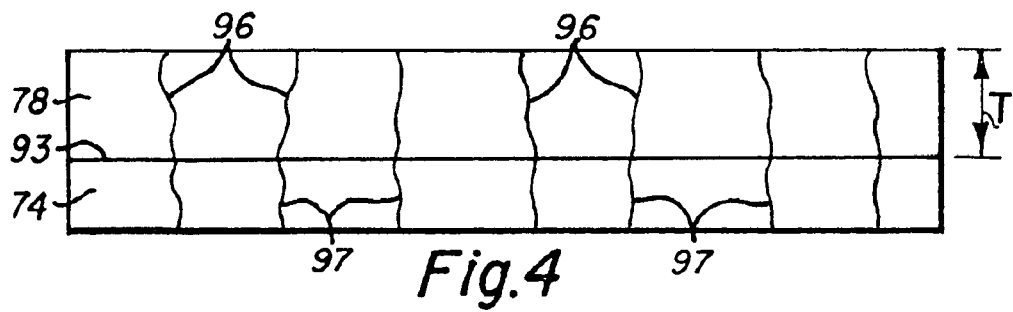
FIG. 4 is an enlarged side cross-sectional view of a seed layer and electrical lead layer of the read head portion of the magnetic head of the present invention.

FIGS. 3 and 4 are enlarged generalized cross-sectional views depicting seed layers and electrical lead layers, wherein FIG. 3 depicts a prior art seed layer 90 and electrical lead layer 91 with an interphase boundary 92 therebetween, and FIG. 4 depicts a seed layer 74 and electrical lead layer 78 of the present invention with an interphase boundary 93 therebetween. As depicted in FIG. 3, the seed layer 90 includes a plurality of crystalline grain boundaries 94, and the electrical lead layer 91 likewise includes a plurality of crystalline grain boundaries 95. It is significant to note that the grain boundaries 94 and 95 are not matched at the interphase boundary 92. That is because the interatomic spacings of the crystalline structure of the seed layer material are not sufficiently close to the interatomic spacings of the crystal structure of the material that comprises the electrical lead layer 91, so that the seed layer is not a good template for grain-to-grain epitaxy.

By contrast, as depicted in FIG. 4, the material that forms the seed layer 74 of the present invention has a microcrystalline structure having interatomic spacings that more closely match those of the material forming the electrical lead layer 78. When the interatomic spacings are matched across the interphase boundary 93, the crystals within the seed layer 74 serve as a template for the crystal structure of the lead layer 78. This epitaxial matching of the seed layer grain structure with the electrical lead layer grain structure results in the grain boundaries 96 of the electrical lead material growing in alignment with the grain boundaries 97 of the seed layer 74, as can be seen in FIG. 4. The further growth of grains in the lead layer, results in grains with an overall larger grain size, because grain diameter tends to broaden with the increasing thickness of the lead layer. Moreover, the overall grain size is larger because the starting grain size of the seed layer provides a direct template for the growth of larger grains in the lead layer through the process of grain-to-grain epitaxial growth. Grain-to-grain epitaxial growth of a grain in the lead layer occurs on the individual grains in the seed layer, rather than growth from small randomly nucleated grains located at the interface within the lead layer.

Therefore, in comparing the microcrystalline structure of the present invention (FIG. 4) with that of the prior art (FIG. 3) it can be seen that the electrical lead layer 78 of the present invention is formed with fewer grain boundaries 96 than the prior art electrical lead layer 91. Moreover, there are fewer intragranular defects such as dislocations in the lead layer because at an epitaxially well-matched interface there is less stress generated which is a driving force for dislocation formation in the lead overlayer. A first result of the electrical lead structure of the present invention is that the electrical leads 78 are more highly conductive than the electrical leads 91 of the prior art, due to the fewer, grain boundaries 96, and intragranular defects within the electrical lead material's microcrystalline structure. Therefore, and as a further result, the thickness T of the electrical leads 78 of the present invention may be fabricated to be less than the thickness t of the prior art electrical leads 91, while achieving the same electrical conductivity as the prior art electrical leads. That is, the epitaxially matched seed layer of the present invention will result in a reduction in the resistance of a lead overlayer having a thickness T of around 5 to 20%. Thus, because electrical resistance generally scales directly with thickness, an epitaxially matched seed layer plus lead layer of the present invention can have a reduced thickness of 5 to 20% while achieving the same electrical resistance. Furthermore, this reduction in electrical lead thickness can result in a reduced read gap thickness that can ultimately result in an increase in the areal data storage density of a hard disk drive that incorporates a magnetic head of the present invention.

Figure 5:
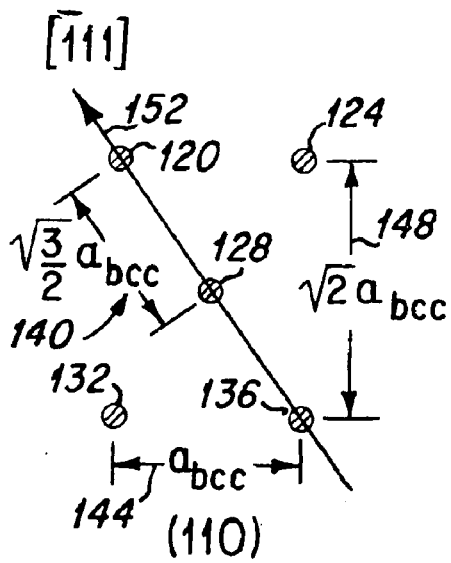
FIG. 5 is a projection of a closest packed (110) plane in a BCC crystal structure showing the arrangement of atomic sites on the surface of the BCC seed layer and their relationship to a closest packed [$\bar{1}$11] direction.

FIG. 5 shows the atomic arrangement on a closest packed (110) plane in a material with a BCC crystal structure. The location of atomic sites within the plane is indicated by the partially shaded circles, 120, 124, 128, 132, and 136. In this arrangement, the four atomic sites 120, 124, 132, and 136, are centered at the corners of a rectangle, and a fifth site, 128, is centered at the center of the rectangle. The distance, 144, between atomic centers at the base of the rectangle, 132, and 136, is given by the lattice constant of the BCC unit cell, $a_{bcc}$. The distance, 148, between atomic centers along a side of the rectangle, 124, and 136, is the height of the rectangle given by the $\sqrt{2}a_{bcc}$. Atomic sites along a diagonal of the rectangle, 120, 128, and 136 lie along a straight line lying in the (110) plane that is coincident with a [$\bar{1}$11] closest packed direction, 152, in the BCC crystal structure. The distance, 140, separating two adjacent atomic sites, 128, and 120, along the [$\bar{1}$11] closest packed direction is $(\sqrt{3}/2)a_{bcc}$. To those skilled in the art, it is seen that atomic sites along the second diagonal of the rectangle, 124, 128, and 132 lie along a straight line lying in the (110) plane that is also coincident with another closest packed direction in the BCC crystal structure. Consequently, the distances separating the adjacent atomic sites, 128 and 136, 128 and 132, and 128 and 124, along respective closest packed directions is also $(\sqrt{3}/2)a_{bcc}$.

FIG. 6 shows the atomic arrangement on a closest packed (111) plane in a material with an FCC crystal structure. The location of atomic sites within the plane is indicated by the open circles, 160, 164, 168, 172, and 176. In this arrangement, four atomic sites 160, 164, 172, and 176, are centered at the corners of a rectangle, and a fifth site, 168, is centered at the center of the rectangle. The distance, 184, between atomic centers at the base of the rectangle, 172, and 176, is given by $(\sqrt{2}/2)a_{fcc}$, where $a_{fcc}$ is the lattice constant of the FCC unit cell. The distance, 188, between atomic centers along a side of the rectangle, 164, and 176, is the height of the rectangle and is given by $(\sqrt{6}/2)a_{fcc}$. Atomic sites along a diagonal of the rectangle, 160, 168, and 176, lie along a straight line lying in the (111) plane that is coincident with a [$\bar{1}$10] closest packed direction, 192, in the FCC crystal structure. The distance, 180, separating two adjacent atomic sties, 168, and 160, along the [$\bar{1}$10] closest packed direction is $(\sqrt{2}/2)a_{fcc}$. It will be apparent to those skilled in the art that atomic sites along the second diagonal of the rectangle, 164, 168, and 172, lie along a straight line lying in the (111) plane that is also coincident with another closest packed direction in the FCC crystal structure. Thus, the distances separating the adjacent atomic sites, 168 and 176, 168 and 172, and 168 and 164, along respective closest packed directions is also $(\sqrt{2}/2)a_{fcc}$.

Referring then to FIG. 7, an overlay of the two structures illustrated in FIG. 5 and FIG. 6 is shown which is useful for discussing certain novel elements of the invention. It is well known to those skilled in the art that there is a preference for metallic layers deposited by means of sputtering to deposit with a preferred orientation in which closest packed planes lie parallel to the substrate upon which such layers are deposited. This manifests itself in the well known fiber textures of <110> for BCC materials, <111> for FCC materials, and <0001> for HCP (hexagonal close packed) materials. FIG. 7 illustrates the orientation relationship and epitaxial matching of atomic sites between a BCC seedlayer material and an FCC overlayer lead material, wherein the BCC seed layer has been deposited with a <110> fiber texture and the FCC lead layer has been deposited with a <111> fiber texture. A novel element of the invention is that it takes advantage of the natural tendency for these materials to deposit with closest packed planes parallel to the substrate to obtain a lead overlayer with fewer defects and consequently improved conductivity. This is accomplished by matching the interatomic spacing between atomic sites across the interface between the seed layer and the lead layer so that the misfit of the interatomic spacing between sites in the two layers is minimized.

A dilemma presents itself as to which atomic sites to match between these two structures because the aspect ratios of the rectangles defining the location of atomic sites in the two structures is different. This situation is encountered in the pseudomorphic heteroepitaxial growth of an overlayer on a seedlayer with different crystal structures. Since most work involving epitaxial growth involves the growth of materials in an overlayer having the same crystal structure of the underlayer, there is no clear method established by which to minimize misfit between structures having different crystal structures. Since in the BCC and FCC crystal structures, the closest packed (110) and (111) planes, respectively, possess atomic sites arranged in a rectangular lattice pattern, as shown by the rectangles in FIGS. 5 and 6, an obvious way to minimize misfit between atomic sites would be to match the location of atomic sites across the interface located along the sides of the rectangles.

However, since the aspect ratios of the two rectangles is not the same, one or the other of the sides must be chosen for the match. If the base of the rectangle is chosen, $a_{bcc}=(\sqrt{2}/2)a_{fcc}$ which results in a mismatch along the height of the rectangles of $(\sqrt{3}-\sqrt{2})a_{bcc}$, or expressed as a percentage of the height of the BCC rectangle, 22.5%. If the height of the rectangle is chosen, $\sqrt{2}a_{bcc}=(\sqrt{6}/2)a_{fcc}$ which results in a mismatch along the base of the rectangles of $(1-\sqrt{6}/3)a_{bcc}$, or expressed as a percentage of the base of the BCC rectangle, 18.4%. These are rather large misfit values which can result in lack of epitaxy between the structure at worse, and in increased numbers of crystal defects, at best, when compared to the improved match which is one object of the present invention.

A non-obvious way to overcome these difficulties is to epitaxially match the atomic sites along a first closest packed direction of a first closest packed plane in a seed layer across the interface of the seed layer with an overlayer, in this case, the lead layer, to the atomic sites along a second closest packed direction of a second closest packed plane in the overlayer, in this case, the lead layer, wherein the closest packed planes of the respective layers lie essentially parallel to each other. This is illustrated for the case of a BCC seed underlayer with an FCC lead overlayer in FIG. 7; but the general concept applies to the cases of an HCP seed underlayer with a BCC lead overlayer, an HCP seed underlayer with an FCC lead overlayer, an FCC underlayer with a BCC lead overlayer, a BCC seed underlayer with an HCP lead overlayer, and an FCC seed underlayer with a BCC lead overlayer. The cases of an FCC underlayer with an FCC lead overlayer, a BCC lead underlayer with a BCC lead overlayer, and an HCP underlayer with an HCP lead overlayer may also be seen as encompassed by the general concept.

Referring again to FIG. 7, the case of an FCC overlayer on a BCC seed underlayer is illustrated. When the atomic sites along a first closest packed direction [$\bar{1}$11] of a first closest packed plane (110) in a BCC seed layer are epitaxially matched to those along a second closest packed direction [$\bar{1}$10] of a second closest packed plane (111) in an FCC lead overlayer across the interface between the two layers, wherein the (110) plane of the BCC seed layer lies essentially parallel to the (111) plane of the FCC lead overlayer, the Kurdjumov-Sachs orientation relationship (110) BCC parallel to (111) FCC and [$\bar{1}$11] BCC parallel to [$\bar{1}$10] FCC obtains. If the mismatch between atomic sites in the BCC structure, 120 and 128, and atomic sites in the FCC structure, 160 and 168, is made equal to zero, $(\sqrt{3}/2)a_{bcc}=(\sqrt{2}/2)a_{fcc}$, so that $a_{bcc}=(\sqrt{2}/\sqrt{3})a_{fcc}\cong 0.816a_{fcc}$. This epitaxial match with zero misfit is shown in FIG. 7 by the overlay of the partially shaded circles representing the atomic sites in the BCC structure with the open circles representing the atomic sites in the FCC structure at the positions 200, 204 and 208 along coincident closest packed directions [$\bar{1}$11] and [$\bar{1}$10] shown as direction 212. The separation of atomic sites for this orientation relationship is shown as 216, wherein $(\sqrt{3}/2)a_{bcc}=(\sqrt{2}/2)a_{fcc}$. Note that FIG. 7 does not represent the true location of atoms across the interface, the atomic sites of the FCC overlayer have been shifted by a translation, known in the art as a shuffle, of approximately $(\sqrt{2}/2)a_{bcc}$ along the direction parallel to a line through atomic sites 124 and 136 to emphasize the matching of the interatomic spacing between the centers of adjacent atoms in closest packed directions across the interface.

It is known in the art that reasonably good epitaxy between structures can be obtained with a mismatch in atomic spacings between layers as much as 10% and even more. Referring to FIG. 7, this would correspond to as much as a 10% change from the spacing 216 for either layer which means distance, 180, the spacing of adjacent atoms along the [$\bar{1}$10] direction of the lead overlayer may be as much as 10% larger or smaller than the distance, 140, the spacing of adjacent atoms along the [$\bar{1}$11] direction of the seed underlayer. Therefore, while a 10% mismatch may produce acceptable results, in the preferred embodiments the mismatch is less than 3%, where the seed layer is comprised of a material that is epitaxially matched between atomic sites along a first closest packed direction of a first closest packed plane in said seed layer across the interface of said seed layer with said lead layer, to a second closest packed direction of a second closest packed plane in said electrical lead layer material, wherein said first closest packed plane in said seed layer is essentially parallel to said second closest packed plane in said electrical lead layer. In one embodiment of the invention the lead overlayer is Rh, having an FCC structure, and the seed underlayer is a BCC material selected from the group consisting of V, Mo, W and alloys of 2 or more constituents selected from the group consisting of Ti, V, Mo, W, Nb, Ta, and Cr. Seed layers of W and Mo, and alloys of VMo or VW work particularly well. VMo and VW are particularly good alloys for seed layers to match to Rh, because there is a complete range of solid solutions between pure V and pure Mo or W, all of which have the same BCC crystal structure. When the atomic spacings in Mo and W are altered through alloying with V via Vegard's Law, so that the content is approximately 34 at. % and approximately 43 at. %, respectively, the criteria $a_{bcc}\cong 0.816a_{fcc}$ for an interatomic spacing match with Rh is satisfied. Other FCC materials suitable as lead overlayers are Cu, Ag, and Ir. Ru is a suitable HCP material for the lead overlayer, and Mo, a suitable BCC material for the lead overlayer. The lead materials Cu, Ag, Mo, Ir, Rh and Ru are especially suitable because of their high conductivity.

Another embodiment of the invention is directed towards methods of making such epitaxial lead structures with improved microstructures for high conductivity, i.e. with large grain size and minimal defect content. A preferred method for making such electrical lead structures of a magnetic recording head read element is by depositing the materials used in the lead structure by sputtering. Lead structures having large grain size with minimal dislocation content can be obtained by sputtering the lead layers with a plasma vapor deposition (PVD) process onto a substrate by heating the substrate to approximately 250° C.

However, even better results in terms of enlarging grain size, and minimizing the content of defects such as, entrained sputtering gases, vacancies, and dislocations, can be obtained by sputtering the materials in the lead structure with ion beam deposition (IBD). Xe and Kr are the gases of choice to obtain lead structures with these improved microstructures by IBD sputtering. Moreover, when the substrate temperature is raised by heating to approximately 250° C., a further boost in grain size can be obtained. A further benefit of IBD sputtering is that the high adatom mobility of the deposited atomic species improves the epitaxial match between the seed underlayer and the lead overlayer in the lead structure as a consequence of the higher kinetic energy of such adatoms, compared with those produced by PVD, which allows them to settle into sites with the best epitaxial match to the seed layer.

A preferred embodiment of the invention comprises a BCC seed layer 74 with a <110> fiber texture that is fabricated upon a beta-Ta buffer layer deposited on the hard bias structure 70, and upon which is deposited an FCC lead material 78 with high conductivity, preferably Rh, having a <111> fiber texture. The lattice constant of the BCC seed layer is adjusted according to Vegard's Law by alloying a suitable BCC transition metal with another transition metal so that essentially $a_{bcc}=0.816a_{fcc}$, which is the condition given by the Kurdjumov-Sachs orientation relationship for matching the interatomic spacings between the close placed directions, [$\bar{1}11$], and [$\bar{1}10$], of the closest packed planes, (110), and (111), of the BCC and FCC lattices, respectively.

Suitable alloys satisfying the required lattice constant matching condition for seed layer 74 include a VMo alloy with the amount of V from approximately 29 at. % to 39 at. % and preferably approximately equal to 34 at. %, and a VW alloy with the amount of V from approximately 38 at. % to 48 at. %, and preferably approximately equal to 43 at. %. A small amount of Cr no more than approximately 20 at. % may be added to these alloys to improve corrosion resistance. If Cr is added the amount of V must be correspondingly decreased to maintain the structural matching condition of $a_{bcc} \cong 0.816 a_{fcc}$. The thickness of the seed layer of the present invention is in the range of approximately 5 Å to 100 Å, and preferably around 35 Å.

While the invention has been shown and described with reference to certain preferred embodiments, it will be understood by those skilled in the art that various alterations in form and detail may be made therein without departing from the true spirit and scope of the invention. For instance it will be apparent to others skilled in the art that the use of seed layers 74 with the same crystal structure but other orientation relationships also fall within the scope of the invention. Likewise, the use of seed layers 74 with different fiber textures that produce different orientation relationships, or seed layers 74 with different structures other than BCC, for example HCP, and FCC, are all encompassed by the spirit of the invention. It is therefore intended that the following claims cover all such alterations and modifications in form and detail that nevertheless include the true spirit and scope of the invention.

What we claim is:

1. A magnetic head comprising:
   a read head structure including a magnetoresistive sensor and an electrical lead structure that includes a seed layer and an electrical lead layer;
   said electrical lead layer being composed of a material selected from the group consisting of Cu, Ag, Mo, Ir, Rh and Ru; and
   said seed layer being comprised of a material that is epitaxially matched between atomic sites along a first closest packed direction of a first closest packed plane in said seed layer across an interface of said seed layer with said lead layer, to a second closest packed direction of a second closest packed plane in said electrical lead layer material, wherein said first closest packed plane in said seed layer is essentially parallel to said second closest packed plane in said electrical lead layer.

2. A magnetic head as described in claim 1, wherein said seed layer is comprised of material selected from the group consisting of V, Mo, W and alloys of two or more constituents selected from the group consisting of V, Mo, W, Nb, Ta, Ti and Cr.

3. A magnetic head as described in claim 2 wherein said seed layer has a thickness of from 5 Å to 100 Å.

4. A magnetic head as described in claim 2 wherein said seed layer has a thickness of approximately 35 Å.

5. A magnetic head as described in claim 1 wherein said lead layer is Rh and said seed layer is comprised of VMo, wherein the amount of V is from approximately 29 at. % to 39 at. %.

6. A magnetic head as described in claim 1 wherein said lead layer is Rh and said seed layer is comprised of VMo, wherein the amount of V is approximately equal to 34 at. %.

7. A magnetic head as described in claim 1 wherein said lead layer is Rh and said seed layer is comprised of VW, wherein the amount of V is from approximately 38 at. % to 48 at. %.

8. A magnetic head as described in claim 1 wherein said lead layer is Rh and said seed layer is comprised of VW, wherein the amount of V is approximately equal to 43 at. %.

9. A magnetic head comprising:
   a read head structure including a magnetoresistive sensor and an electrical lead structure that includes a seed layer and an electrical lead layer;
   said electrical lead layer being comprised of a material having an FCC crystal structure and being selected from the group consisting of Cu, Ag, Ir and Rh, and said seed layer being comprised of a material having a BCC crystal structure, and wherein said FCC crystal structure and said BCC crystal structure have the relationship that $a_{bcc}$ is approximately equal to $0.816 a_{fcc}$.

10. A magnetic head as described in claim 9, wherein said electrical lead layer is comprised of Rh, and said seed layer is comprised of a material selected from the group consisting of V, Mo, W and alloys of two or more constituents selected from the group consisting of V, Mo, W, Nb, Ta, Ti and Cr.

11. A magnetic head as described in claim 10 wherein said seed layer has a thickness of from 5 Å to 100 Å.

12. A magnetic head as described in claim 10 wherein said seed layer has a thickness of approximately 35 Å.

13. A magnetic head as described in claim 9 wherein said lead layer is Rh and said seed layer is comprised of VMo, wherein the amount of V is from approximately 29 at. % to 39 at. %.

14. A magnetic head as described in claim 9 wherein said lead layer is Rh and said seed layer is comprised of VMo, wherein the amount of V is approximately equal to 34 at. %.

15. A magnetic head as described in claim 9 wherein said lead layer is Rh and said seed layer is comprised of VW, wherein the amount of V is from approximately 38 at. % to 48 at. %.

16. A magnetic head as described in claim 9 wherein said lead layer is Rh and said seed layer is comprised of VW, wherein the amount of V is approximately equal to 43 at. %.

17. A hard disk drive comprising:
   a motor for rotating a spindle;
   a thin film magnetic disk mounted on the spindle; and
   an actuator assembly having a magnetic head mounted thereon wherein said magnetic head includes:
   a read head structure including a magnetoresistive sensor and an electrical lead structure including a seed layer and an electrical lead layer
   said electrical lead layer being comprised of a material having an FCC crystal structure and being selected from the group consisting of Cu, Ag, Ir and Rh, and said seed layer being comprised of a material having a BCC crystal structure, and wherein said FCC crystal structure and said BCC crystal structure have the relationship that $a_{bcc}$ is approximately equal to $0.816 a_{fcc}$.

18. A hard disk drive as described in claim 17, wherein said electrical lead layer is comprised of Rh, and said seed layer is comprised of a material selected from the group consisting of V, Mo, W and alloys of two or more constituents selected from the group consisting of V, Mo, W, Nb, Ta, Ti and Cr.

19. A hard disk drive as described in claim 18 wherein said seed layer has a thickness of from 5 Å to 100 Å.

20. A hard disk drive as described in claim 18 wherein said seed layer has a thickness of approximately 35 Å.

21. A magnetic head as described in claim 17 wherein said lead layer is Rh and said seed layer is comprised of VMo, wherein the amount of V is from approximately 29 at % to 39 at. %.

22. A magnetic head as described in claim 17 wherein said lead layer is Rh and said seed layer is comprised of VMo, wherein the amount of V is approximately equal to 34 at. %.

23. A magnetic head as described in claim 17 wherein said lead layer is Rh and said seed layer is comprised of VW, wherein the amount of V is from approximately 38 at. % to 48 at. %.

24. A magnetic head as described in claim 17 wherein said lead layer is Rh and said seed layer is comprised of VW, wherein the amount of V is approximately equal to 43 at. %.

* * * * *